US008260688B2

(12) United States Patent
Hinks

(10) Patent No.: US 8,260,688 B2
(45) Date of Patent: Sep. 4, 2012

(54) METHOD AND SYSTEM FOR FACILITATING PLACEMENT OF AN ORDER USING AN ORDERING APPLICATION VIA A CELLULAR SERVING NODE

(75) Inventor: Jessie C. Hinks, Neshanic Station, NJ (US)

(73) Assignee: Alcatel Lucent, Paris (FR)

( * ) Notice: Subject to any disclaimer, the term of this patent is extended or adjusted under 35 U.S.C. 154(b) by 263 days.

(21) Appl. No.: 12/640,345

(22) Filed: Dec. 17, 2009

(65) Prior Publication Data

US 2011/0153457 A1    Jun. 23, 2011

(51) Int. Cl.
*G06Q 30/00*    (2012.01)
(52) U.S. Cl. ............. 705/26.81; 705/26.1; 705/26.61; 705/26.8; 705/26.82; 705/27.1
(58) Field of Classification Search ......... 705/26.1–27.2
See application file for complete search history.

(56) References Cited

U.S. PATENT DOCUMENTS

| | | | | |
|---|---|---|---|---|
| 2001/0047423 | A1* | 11/2001 | Shao et al. | 709/235 |
| 2002/0049644 | A1* | 4/2002 | Kargman | 705/26 |
| 2007/0288662 | A1* | 12/2007 | Chen | 709/247 |
| 2009/0003265 | A1* | 1/2009 | Agarwal et al. | 370/328 |
| 2009/0178058 | A1* | 7/2009 | Stillwell et al. | 719/317 |
| 2010/0299225 | A1* | 11/2010 | Aarni et al. | 705/27 |

OTHER PUBLICATIONS

"NetLogic Microsystems and BroadWeb Corporation Announce Collaboration to Develop Hardware-Accelerated Application-Aware Management Suite for NETL7(TM)". Business Wire Tuesday, May 19, 2009.*
"Spain's TeleCable Deploys Juniper Solutions". Anonymous. Wireless News. May 8, 2008.*

* cited by examiner

*Primary Examiner* — William Allen
(74) *Attorney, Agent, or Firm* — Wall & Tong, LLP

(57) ABSTRACT

A purchasing capability is provided for supporting purchasing by a customer from an establishment, which may include functions such as placement of orders, processing of orders, and like functions. An order is placed from a mobile node (MN) of the customer to an application server (AS) of the establishment to which the order is placed. The AS may process the order for determining whether or not to accept the order and, where accepted, for completing the order. A payment commitment verification process may be used for verifying the commitment of the customer to pay for the order. The placement and processing of the order may be performed using an ordering application supported by the MN and the AS. The communication in support of the purchasing capability may be facilitated using a cellular serving node (CSN) configured for communicating with both the MN and the AS wirelessly. The communication between the MS and AS for the purchasing capability may be via an always-on connection established between the MN and the AS.

13 Claims, 6 Drawing Sheets

METHOD AND SYSTEM FOR FACILITATING PLACEMENT OF AN ORDER USING AN ORDERING APPLICATION VIA A CELLULAR SERVING NODE

FIELD OF THE INVENTION

The invention relates generally to facilitating purchasing and, more specifically but not exclusively, to facilitating purchasing between a mobile node (MN) and an application server (AS) using a cellular serving node (CSN) where the CSN is configured for communicating with the MN and the AS wirelessly.

BACKGROUND

The restaurant industry is continually looking for ways to improve performance and efficiency of customer service, from order taking to food serving and payment by the customer. While significant improvements have been made in each of these areas, the order taking process is still solely reliant on store associates, e.g., by servers taking orders at the counter or at the table in sit-down restaurants and by associates taking orders via speaker communication systems in drive-thru restaurants.

In sit-down restaurants, the order taking process is completely reliant on the waiter or waitress, and waiting for the waiter or waitress to come to your table to take your order may be quite frustrating. This is especially true in light of the fact that more and more families with busy schedules are going to neighborhood restaurants just to get the family fed so that the parents do not have to cook after having worked a full day (i.e., the parents need to get the kids fed with meals fast).

In drive-thru restaurants, the menu board and speaker communication system have existed for decades. The latest improvement to the menu board and speaker communication system is the use of an LCD display in order to display to the customer both the items being ordered and the total price for the order. Additionally, other recent attempts to improve the drive-thru process include: (1) use of call centers at which call center associates take orders from customers over the phone, (2) use of mobile order taking devices by store associates standing in the drive-through line, and (3) self-serving kiosks, each of which has disadvantages associated therewith. When call centers are used, the customer is still required to speak with the associates, which does not improve the speed or accuracy of the order taking. Similarly, when mobile order taking devices, are used, the customer is still required to speak with the associates, which, again, does not improve the speed or accuracy of the order taking. Furthermore, such devices are typically only used when the drive-thru line is long and, thus, the customer still must wait in the line before receiving the food. When self-serving kiosks are used, the customer still must wait in line to access the self-serving kiosk.

SUMMARY

Various deficiencies in the prior art are addressed by embodiments that provide an improved purchasing capability. In one embodiment, a purchasing capability is provided for supporting purchasing by a customer from an establishment, which may include functions such as placement of orders, processing of orders, and like functions. An order is placed from a mobile node (MN) of the customer to an application server (AS) of the establishment to which the order is placed. The AS may process the order for determining whether or not to accept the order. A payment commitment verification process may be used for verifying the commitment of the customer to pay for the order. The AS may process the order for completing the order where the order is accepted by the AS. The placement and processing of the order may be performed using an ordering application supported by the MN and the AS. The communication in support of the purchasing capability may be facilitated using a cellular serving node (CSN) configured for communicating with both the MN and the AS wirelessly. The communication between the MS and AS for the purchasing capability may be via an always-on connection established between the MN and the AS. The communication between the MS and the AS for the purchasing capability may be performed with or without a Central Application Server (CAS) accessible from the CSN via a core network that supports the CSN. The always-on connection may be established and maintained via a paging-based keep-alive process or a discovery-based keep-alive process. The CSN may or may not be application-aware. If the CSN is application-aware the CSN may perform application-level functions in support of the purchasing capability. If the CSN is not application-aware, a central application server (CAS) may provide application-level functions in support of the purchasing capability.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

An improved purchasing capability is depicted and described herein. The improved purchasing capability provides improvements in order taking, order fulfillment, payment, and other aspects of making purchases. The improved purchasing capability depicted and described herein is suitable for use in any environment in which customers may need or want to place orders, such as for placing orders via the at drive-thru at fast food restaurants, place orders for movie tickets at movie theaters, placing orders for prescriptions at pharmacies, and the like. Thus, although primarily depicted and described herein within the context of placing an order via a drive-thru at a fast food restaurant, the improved purchasing capability depicted and described herein may be utilized at other types of restaurants, other types of businesses, other types of establishments (e.g., not-for-profit organizations, governmental organizations, or any other types of establishments or organizations), and the like).

Figure 1:
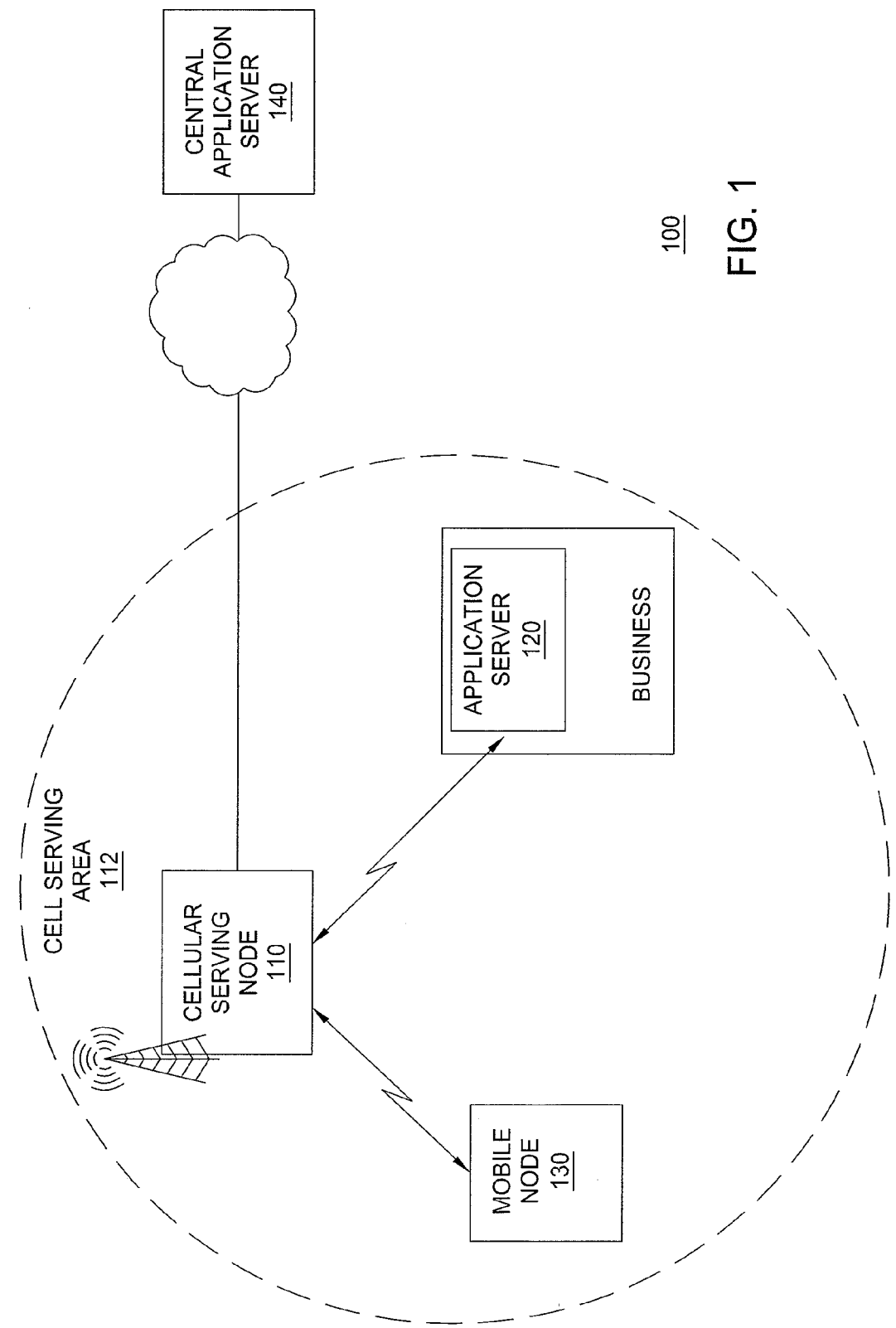
FIG. 1 depicts a high-level block diagram of an exemplary system architecture for providing the improved purchasing capability.

FIG. 1 depicts a high-level block diagram of an exemplary system architecture for providing the improved purchasing capability.

As depicted in FIG. 1, exemplary system architecture 100 includes a cellular serving node (CSN) 110 that facilitates communication between an application server (AS) 120 and a mobile node (MN) 130 in a cell serving area (CSA) 112. The exemplary system architecture 100 also may include a central application server (CAS) 140.

The CSN 110 supports wireless communications within CSA 112. The CSN 110 may support communications using any suitable cellular wireless technology, such as Code Division Multiple Access (CDMA) technologies (e.g., 1X, EVDO, and the like), Universal Mobile Telecommunication System (UMTS) technologies, Long Term Evolution (LTE) technologies, or any other suitable cellular wireless technology.

In one embodiment, CSN 110 is application-aware. In this embodiment, CSN 110 may directly provide application-level functions in support of the improved purchasing capability (e.g., managing application-specific keep-alive processes, participating in commitment verification processes, and the like, as well as combinations thereof). In one such embodiment, CAS 140 also may provide application-level functions in support of the improved purchasing capability, which may be provided in combination with functions provided by CSN 110 and/or in addition to functions provided by CSN 110.

In one embodiment, CSN 110 is not application aware. In this embodiment, CSN 110 will not directly provide application-level functions in support of the improved purchasing capability; rather, such application-level functions are provided by CAS 140. In this embodiment, CSN 110 supports the improved purchasing capability indirectly by facilitating communications between AS 120 and CAS 140, facilitating communications between MN 130 and CAS 140, and facilitating communications between AS 120 and MN 130, where such communications are supported for providing functions of the improved purchasing capability.

The AS 120 is an application server suitable for use in providing application functions in support of the improved purchasing capability.

The AS 120 is deployed within the establishment that is providing the improved purchasing capability to its customers (e.g., in the restaurant, movie theater, and the like).

The AS 120 is configured to communicate with CSN 110 wirelessly using the cellular technology supported by the CSN 110 (e.g., using CDMA, UMTS, LTE, and the like). For example, CNS 110 may be equipped with one or more air cards supporting the cellular technology used by CNS 110.

The AS 120 is configured to support various functions associated with the improved purchasing capability.

The AS 120 is configured to support application-specific functions for providing the improved purchasing capability. The AS 120 is configured to run an ordering application by which the AS 120 may receive and process orders from MNs. The AS 120 is configured to support an application-specific keep-alive process by which AS 120 may establish and maintain always-on connections with MNs within CSA 112 that are running the ordering application. The AS 120 is configured to support a payment commitment verification process by which AS 120 may verify a commitment of the customer to pay for an order. The AS 120 may provide various other application-level functions in support of the improved purchasing capability.

The AS 120 may support various other functions for use in providing or supporting the improved purchasing capability.

The MN 130 is a mobile node suitable for use with the improved purchasing capability. For example, MN 130 may be a cellular phone or any other end user device suitable for use with the improved purchasing capability.

The MN 130 is configured to communicate with CSN 110 wirelessly using the cellular technology supported by CSN 110 (e.g., using CDMA, UMTS, LTE, and the like).

The MN 130 is configured to support application-specific functions for providing the improved purchasing capability.

The MN 130 is configured to support an application-specific keep-alive process by which the MN 130 may establish and maintain an always-on connection to AS 120 via CSN 110.

The MN 130 is configured to run an ordering application by which the customer may enter and submit orders via MN 130 and the MN 130 may send the submitted orders to AS 120 for processing. The ordering application may be pre-installed on MN 130, downloaded to MN 130 (e.g., from AS 120, from a web server associated with a corporate division of the restaurant in which AS 120 is deployed, or from any other suitable source).

The MN 130 includes a user interface via which a user may interface with the ordering application, e.g., to launch the ordering application, interact with the ordering application to make selections for the order, review the order prior to submission, request that the order be saved for later completion and/or submission, submit the order for processing by AS 120, and the like.

The MN 130 may provide various other application-level functions in support of the improved purchasing capability.

The MN 130 may support various other functions for use in providing or supporting the improved purchasing capability.

As described herein, the AS 120 and the MN 130 each run an ordering application. The ordering application is any application that is suitable for use by MN 130 in placing orders and suitable for use by AS 120 in processing orders. The ordering application may be implemented in any suitable manner.

In one embodiment, the ordering application is a generic application adapted for use by multiple companies. The multiple companies that use a generic ordering application may be companies within different industries, companies within a particular industry, companies within a particular segment of an industry, and the like. For example, all companies may use an ordering application independent of the industry within which the companies operate (e.g., fast food companies and movie theater companies use the same ordering application), all companies within a given industry use the same ordering application but different industries use different ordering applications (e.g., fast food industries use a first ordering application and movie theater companies use a second ordering application), all companies within a given segment of an industry use the same ordering application but different segments use different ordering applications (e.g., burger-based fast-food restaurants use a first ordering application and pizza-based fast food restaurants using a second ordering application), and the like, as well as various combinations thereof.

In one embodiment, the ordering application may be more specific, such as where the ordering application is specific to a particular company (e.g., McDonalds has its own ordering application, Burger King has its own ordering application, and so forth). In one such embodiment, an ordering application specific to a company may even be further configured such that it becomes tailored to a subset of the stores of the company (e.g., where different stores of a company support different inventories of items or services available for purchase).

The ordering application may be implemented using any suitable application technology capable of providing an application by which a user may use a mobile device to enter and send an order and as associated application server may receive and process the order. Thus, the ordering application may be implemented using any suitable application interface capabilities, application protocols, application processing capabilities, and the like, as well as combinations thereof.

Although primarily referenced herein as being an ordering application, it will be appreciated that the ordering application also may support functions associated with other aspects of purchasing and, thus, also may be referred to herein as a purchasing application.

As depicted in FIG. 1, exemplary system architecture 100 includes a central application server (CAS) 140.

The CAS 140 is configured to be able to communicate with any of the other components of system architecture 100 (e.g., CSN 110, AS 120, and MN 130). The CAS 140 communicates with AS 120 and MN 130 via CSN 110. The communication between CAS 140 and CSN 110 may be provided using any suitable communications technology, e.g., using any suitable type of backhaul from a radio access network to the core network supporting the radio access network (which may depend on the type of radio access network technology utilized by CSN 110).

The CAS 140 may communicate with AS 120 for providing application software updates to AS 120. The CAS 140 may communicate with MN 130 for providing application software updates (e.g., such as where there are updates to the menu), direct promotion notifications, and the like to MN 130. The CAS 140 may initiate such communication periodically and/or responsively (e.g., upon detecting changes requiring updates to be sent to CSN 110, AS 120, and/or MN 130, in response to requests from CSN 110, AS 120, and/or MN 130, and the like).

In one embodiment, in which CSN 110 is application-aware, CSN 110 may directly provide application-level functions in support of the improved purchasing capability (as described above), and CAS 140 may communicate with CSN 110 for providing application software updates to CSN 110 for use by CSN 110 in providing the application-level functions in support of the improved purchasing capability. In this embodiment, the CAS 140 also may provide application-level functions in support of the improved purchasing capability, which may be provided in combination with the application-level functions provided by CSN 110 and/or in addition to the application-level functions provided by CSN 110 (e.g., providing commitment verification, billing/payment verification, and/or any other suitable functions).

In one embodiment, in which CSN 110 is not application-aware, CAS 140 provides application-level functions in support of the improved purchasing capability. In this embodiment, the CAS 140 may be configured to support an application-specific keep-alive process by which AS 120 may establish and maintain always-on connections with MNs within CSA 112 that are running the ordering application. In this embodiment, the CAS 140 may be configured to support a payment commitment verification process by which AS 120 may verify a commitment of the customer to pay for an order. In this embodiment, the CAS 140 may support other application-level functions in support of the improved purchasing capability. In this embodiment, CSN 110 merely supports the improved purchasing capability indirectly by facilitating communications between AS 120 and CAS 140, between MN 130 and CAS 140, and between AS 120 and MN 130.

In one embodiment, the purchasing process may proceed as follows. A user of MN 130 launches the ordering application on MN 130. The user makes ordering selections via the ordering application. The user may then save the order for later submission (e.g., where the user is not yet within the close proximity of the business or not within the cellular serving area, or is not ready to place the order even where the user may be within close proximity of the business or at least within the cellular serving area) or submit the order (e.g., where the user is within close proximity of the business or is at least within the cellular serving area, and is ready to place the order). The MN 130, upon submission of the order by the user, transmits the order to AS 120 via CSN 110. The MN 130 may transmit the order by either (1) establishing a connection to AS 120 via CSN 110 and propagating the order via the established connection or (2) by propagating the order via a pre-established always-on connection between MN 130 and AS 120 (e.g., such as where the exemplary system architecture 100 supports an application-specific keep-alive capability, exemplary embodiments of which are depicted and described with respect to FIG. 3 and FIG. 4). The AS 120 receives the order from MN 130 over the connection established between MN 130 and AS 120 via CSN 110. The AS 120 processes the order. The processing of the order includes determining whether not to accept the order. If the AS 120 does not accept the order, AS 120 may send an order failed message to MN 130. If the AS 120 accepts the order, AS 120 begins processing the order for completing the order. The processing of the order for completing the order may include any functions required for completing the order for the customer (e.g., sending the order to the kitchen of the restaurant so that the food can be prepared for the user, initiating a payment commitment verification process by which the user may verify a commitment to pay for the food that was ordered, initiating billing and/or payment collection where the user is linked to a billing/payment method, and performing any other function(s) which may be required in order to complete the order for the user). The user then picks up the food from the restaurant, pays the restaurant for the food, and either consumes the food at the restaurant or leaves the restaurant with the food. At this point, purchasing of the food by the user (e.g., including order placement, order processing, payment, and receipt of the purchased items) is complete. A general embodiment of a method for placing and processing of an order in the above-described manner is depicted and described with respect to FIG. 2.

Figure 2:
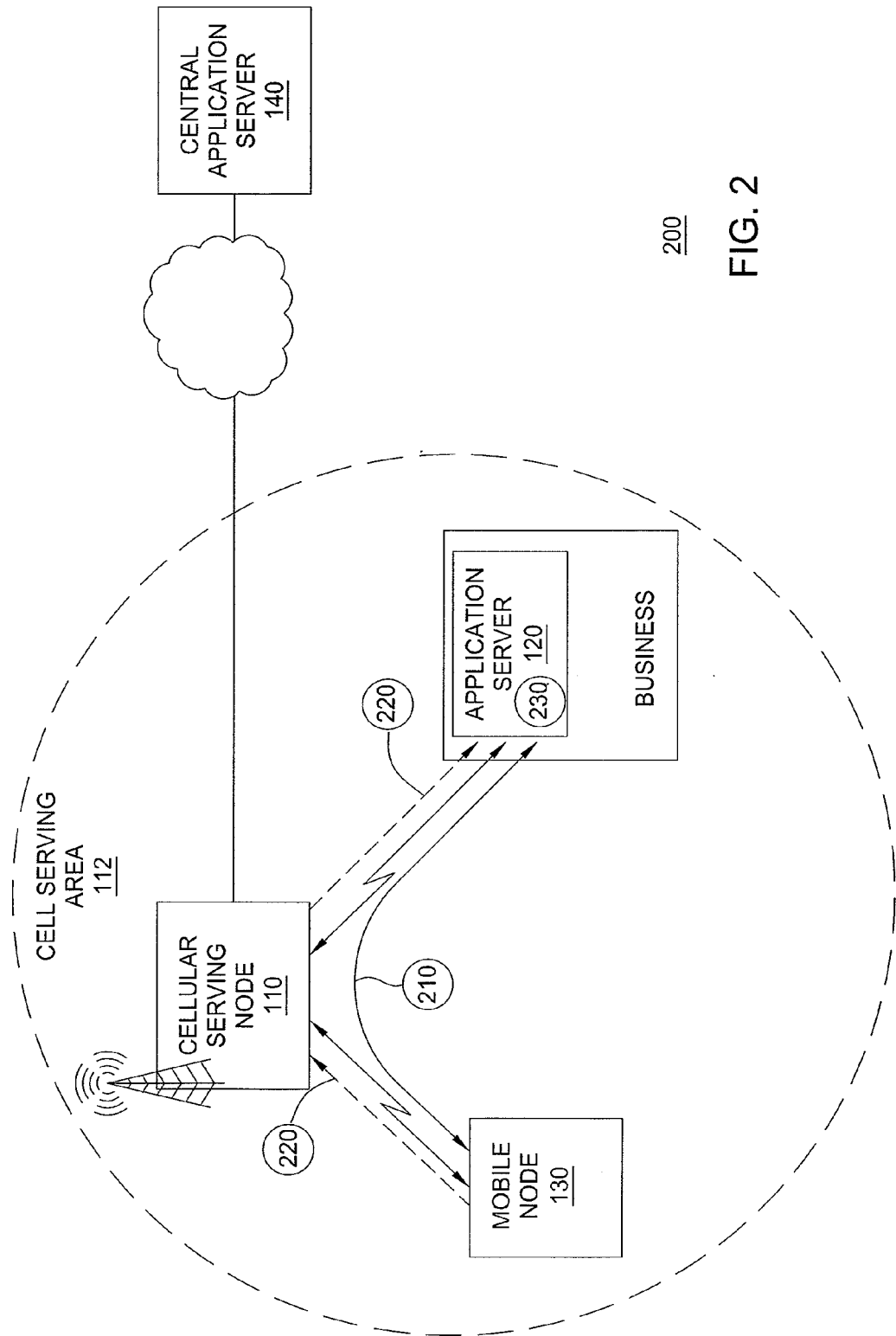
FIG. 2 depicts one embodiment of a method for placing an order using the improved purchasing capability.

FIG. 2 depicts one embodiment of a method for placing an order using the improved purchasing capability.

At step 210, an application-layer connection is established between MN 130 and AS 120 via CSN 110. The application-layer connection may be any suitable connection established in any suitable manner.

At step 220, MN 130 sends an order to AS 120 via the connection established between MN 130 and AS 120 via CSN 110. From the perspective of CSN 110, the CSN 110 receives the order from MN 130 and the CSN 110 propagates the order toward AS 120. The CSN 110 may or may not process the order (e.g., for recognizing the order or for any other suitable purposes).

At step 230, AS 120 processes the order from MN 130. The processing of the order may include any suitable processing (e.g., processing the order for determining whether or not to accept the order, processing the order in order to complete the order where the order is accepted, and the like, as well as combinations thereof). The processing of the order may trigger AS 120 to send messages to other systems located at the business (e.g., to an order processing system), to CAS 140 (e.g., for payment commitment verification, payment verification, and the like), to MN 130 (e.g., for sending an order failed message to MN 130, for sending an order confirmation message to MN 130, and the like), and the like, as well as combinations thereof.

Although primarily depicted and described with respect to specific functions being performed for placement and processing of an order, it will be appreciated that method 200 of FIG. 2 also may encompass any other functions depicted and described herein as being supported in embodiments of the improved purchasing capability (e.g., payment commitment verification, payment, and the like, as well as combinations thereof).

Although this general embodiment of the ordering process is described with respect to an embodiment in which CSN 110 is application-aware, it will be appreciated that this general embodiment of the ordering process may be modified for embodiments in which the CSN 110 is application-aware but shares responsibility with CAS 140 for at least a portion of the application-level functions in support of the ordering process, embodiments in which the CSN 110 is not application-aware and the application-level functions in support of the ordering process are performed by CAS 140, and the like, as well as combinations thereof. In such embodiments, some or all of the communications between MN 130 and AS 120 during the ordering process, which are described above as being via CSN 110, are also sent via CAS 140. In this case, communications received at the CSN 110 are sent from CSN 110 to CAS 140 via the core network and then sent from CAS 140 to CSN 110 via the core network for delivery.

Although this general embodiment of the ordering process is primarily described within the context of a user placing an order for food from a fast food restaurant, it will be appreciated that this general embodiment may be adapted as necessary to support purchasing for other types of purchases made from other types of establishments. As an example, the ordering process may be adapted for the case in which a user completes the purchase of movie tickets from a movie theater upon arriving at the movie theater, such that the user may enter the theater without having to wait in the line to purchase tickets from the teller or print out tickets from a kiosk. As another example, the ordering process may be adapted for the case in which a user orders groceries from a supermarket prior to arriving at the super market, such that the supermarket may retrieve and bag the groceries and the user may pick up the groceries without having to walk around the supermarket to retrieve the groceries and wait in line to pay for the groceries or without having to wait at a "shop from home" pickup parking lot to pickup and pay for the groceries. Thus, the principles of the improved purchasing capability are not intended to be limited to any particular types of purchases made from any particular types of establishments.

As described herein, application-level functions in support of the improved purchasing capability may include functions such as an application-specific keep-alive process, a payment commitment verification process, and the like. The application-specific keep-alive process may be implemented in any suitable manner, which may include using an application-specific paging process, an application-specific discovery process, and the like, as well as combinations thereof. Method according to embodiments of application-specific keep-alive are depicted and described with respect to FIG. 3 and FIG. 4. A method according to one embodiment of payment commitment verification is depicted and described with respect to FIG. 5.

Figure 3:
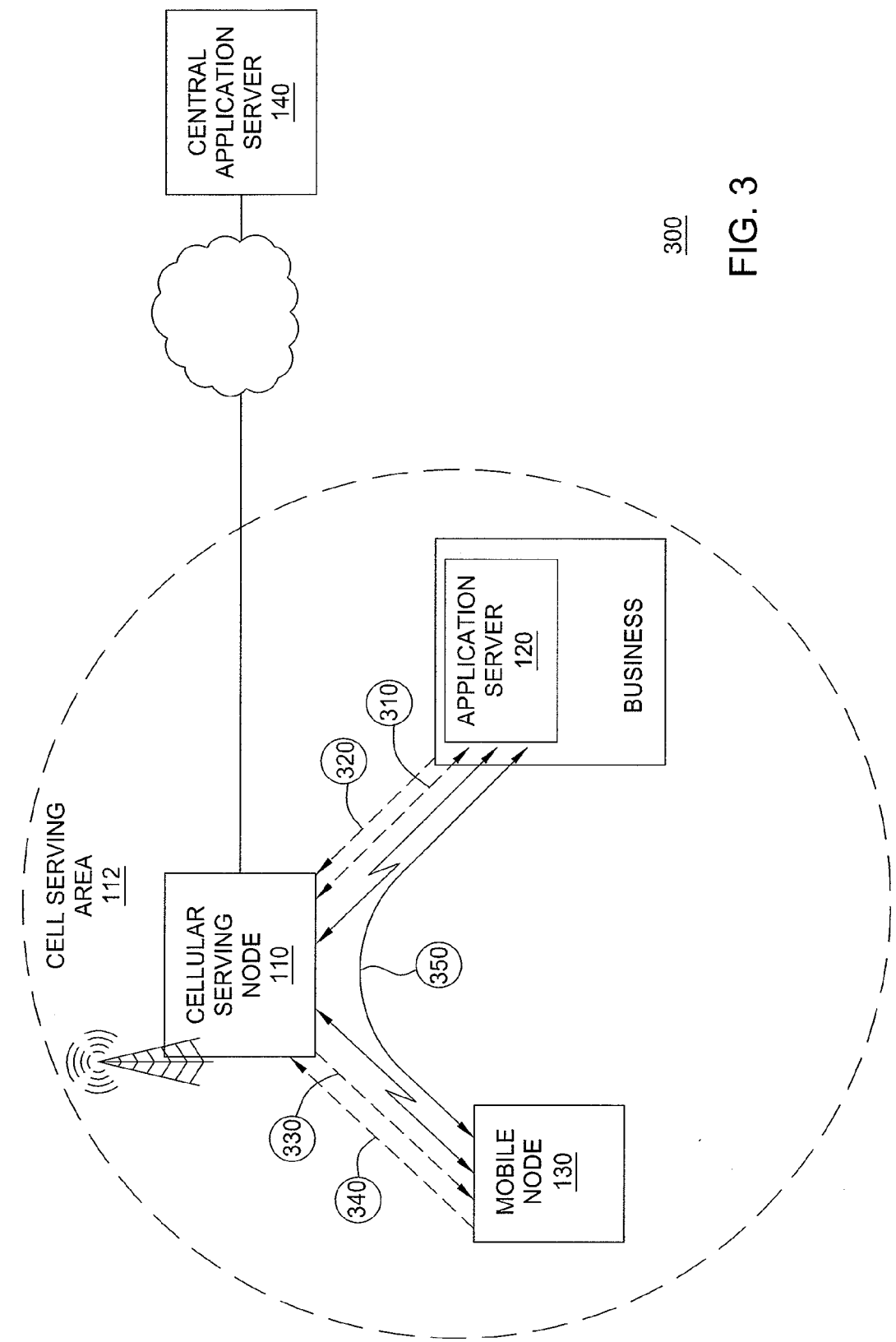
FIG. 3 depicts one embodiment of a method for application-specific keep-alive in which an application-specific paging process is used to establish an always-on connection between a mobile node and an application server.

FIG. 3 depicts one embodiment of a method for application-specific keep-alive in which an application-specific paging process is used to establish an always-on connection between a mobile node and an application server.

At step 310, AS 120 establishes a wireless traffic channel with CSN 110. The wireless traffic channel may be established at any suitable time (e.g., at the time at which the business opens or any other suitable time). The wireless traffic channel may be established in any suitable manner, which may depend on the underlying cellular technology used by CSN 110. In one embodiment, for example, AS 120 may initiate a data call to CSN 110.

At step 320, AS 120 initiates a request to CSN 110 for a list of MNs that are (1) currently within cell serving area 112 and (2) currently running the ordering application.

At step 330, the CSN 110, in response to the request from AS 120, initiates an application-specific paging process by which CSN 110 pages all MNs within cell serving area 112 for determining which of the MNs within cell serving area 112 are currently running the ordering application specific to AS 120. The paging of MNs by CSN 110 requests that any MN that recognizes the application-specific paging request to respond to the application-specific paging request. The application-specific paging request messages sent to other MNs within CSA 112 are omitted for purposes of clarity.

At step 340, MN 130, in response to receiving the application-specific paging request from CSN 110, responds to the application-specific paging request by sending an application-specific paging response. The application-specific paging response may be provided in any manner suitable for informing CSN 110 that MN 130 is currently running the ordering application. The application-specific paging response messages sent from other MNs within CSA 112 are omitted for purposes of clarity.

At step 350, an always-on connection is established between AS 120 and MN 130.

The always-on connection between AS 120 and MN 130 may be established in any suitable manner, which may depend on factors such as the underlying wireless technology used by CSN 110, the manner in which the paging request/response message are implemented (e.g., the information that is included in the messages), and the like. The messaging/signaling which may be utilized for establishing the always-on connection is omitted from FIG. 3 (for purposes of clarity).

In one embodiment, for example, the paging request message from the CSN 110 includes information which identifies the AS 120, such that the MN 130 receiving the paging request message is informed of the source of the paging request. In this embodiment, the paging response message from the MN 130 includes information which identifies the MN 130. The CSN 110, upon receiving the paging response message, either forwards the paging response message to AS 120 (or, optionally, consolidates paging response messages received from multiple MNs in CSA 112 that respond to the paging request message, such that a list of MNs in CSA 112 that are running the ordering application is provided to AS 120). In this embodiment, AS 120 receives information identifying MN 130 and MN 130 receives information identifying AS 120, such that AS 120 and MN 130 may communicate in order to discover each other and establish the always-on connection therebetween.

In one embodiment, for example, the paging request message from the CSN 110 does not include information which identifies the AS 120, and, thus, the MN 130 receiving the paging request message is not informed of the source of the paging request. In this embodiment, the paging response message from the MN 130 includes information which identifies the MN 130. The CSN 110, upon receiving the paging response message, either forwards the paging response message to AS 120 (or, optionally, consolidates paging response messages received from multiple MNs in CSA 112 that respond to the paging request message, such that a list of MNs in CSA 112 that are running the ordering application is provided to AS 120). In this embodiment, a wireless traffic channel is established between MN 130 and CSN 110 (e.g., initiated by MN 130 as part of the paging response message, initiated by MN 130 after sending the paging response message, initiated by the CSN 110 after receiving the paging response message, and the like). In this embodiment, the CSN 110 may then splice the wireless traffic channel established between CSN 110 and AS 120 and wireless traffic channel established between CSN 110 and MN 130, to enable thereby the always-on connection between AS 120 and MN 130 (or at least to facilitate communications between AS 120 and MN 130 for establishing the always-on connection between AS 120 and MN 130).

It will be appreciated that combinations of such capabilities may be used for enabling establishment of an always-on connection between AS 120 and MN 130.

At step 350, upon establishment of the always-on connection between AS 120 and MN 130, the AS 120 and the MN 130 begin exchanging keep-alive message for purposes of maintaining the always-on connection for use in supporting the improved purchasing capability.

Although depicted and described with respect to one paging request by the AS 120, paging requests may be initiated by AS 120 periodically and/or in response to one or more trigger conditions. The use of multiple paging requests ensures that the AS 120 has a current view of the set of MNs that are within CSA 112 and running the ordering application, as this set of MNs is likely to change over time because many of the MNs will be mobile and users may activate and deactivate the ordering application.

Although method 300 is primarily depicted and described with respect to an embodiment in which CSN 110 is application-aware, method 300 of FIG. 3 may be modified for an embodiment in which CSN 110 is not application-aware. In this embodiment, each of the messages exchanged between AS 120 and CSN 110 is exchanged between AS 120 and CAS 140 via CSN 110 and, similarly, each of the messages exchanged between MN 130 and CSN 110 is exchanged between MN 130 and CAS 140 via CSN 110 (i.e., CSN 110 merely provides the transport between the various other nodes). In this embodiment, the paging request message from AS 120 is processed by CAS 140 instead of CSN 110, and the paging response message is processed by CAS 140 instead of CSN 110.

Figure 4:
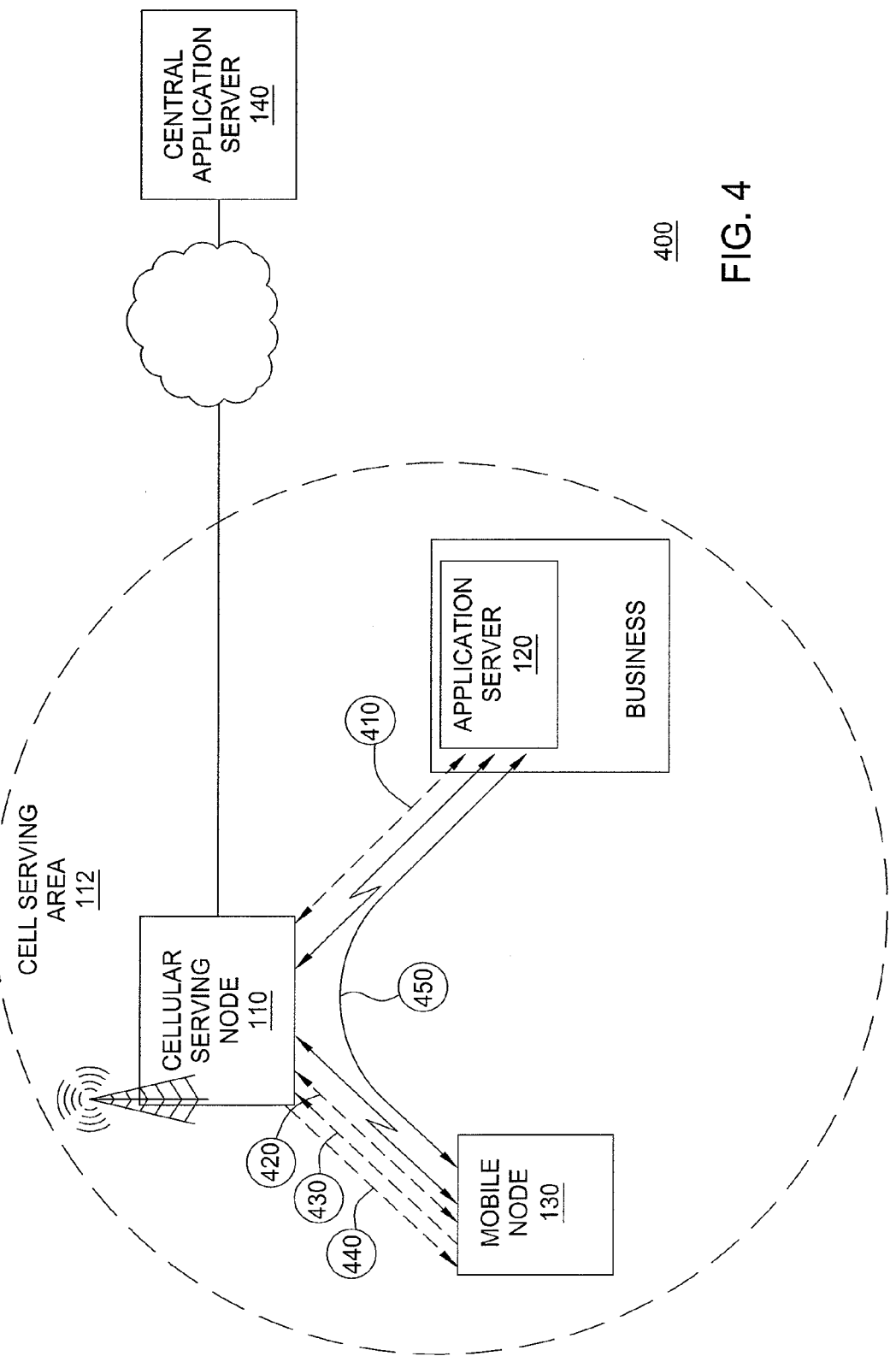
FIG. 4 depicts one embodiment of a method for application-specific keep-alive in which an application-specific discovery process is used to establish an always-on connection between a mobile node and an application server.

FIG. 4 depicts one embodiment of a method for application-specific keep-alive in which an application-specific discovery process is used to establish an always-on connection between a mobile node and an application server.

At step 410, AS 120 establishes a wireless traffic channel with CSN 110. The wireless traffic channel may be established at any suitable time (e.g., at the time at which the business opens or any other suitable time). The wireless traffic channel may be established in any suitable manner, which may depend on the underlying cellular technology used by CSN 110. In one embodiment, for example, AS 120 may initiate a data call to CSN 110.

At step 420, MN 130 establishes a wireless traffic channel with CSN 110. The wireless traffic channel may be established at any suitable time (e.g., at the time at which MN 130 enters CSA 112 and detects CSN 110, in response to a request by the user via an interface of MN 110, and the like). The wireless traffic channel may be established in any suitable manner, which may depend on the underlying cellular technology used by CSN 110. In one embodiment, for example, MN 130 may initiate a data call to CSN 110.

At step 430, MN 130 initiates a discovery request, via the wireless traffic channel with CSN 110, for an indication as to whether there is a server that is (1) operating within CSA 112 and (2) currently running the ordering application. The discovery request is initiated as an application level message.

At step 440, CSN 110, in response to the discovery request from MN 130, responds to the discovery request by sending a discovery response to MN 130. The discovery response includes information identifying AS 120 (e.g., information which MN 130 may utilize to initiate communications with AS 120 for establishing an always-on connection between AS 120 and MN 130). The discovery response may be provided in any manner suitable for informing MN 130 that AS 120 is running the ordering application.

At step 450, an always-on connection is established between AS 120 and MN 130. The always-on connection between AS 120 and MN 130 may be established in any suitable manner, which may depend on factors such as the underlying wireless technology used by CSN 110, the manner in which the discovery request/response message are implemented (e.g., the information that is included in the messages), and the like. The messaging/signaling which may be utilized for establishing the always-on connection is omitted from FIG. 4 for purposes of clarity.

At step 450, upon establishment of the always-on connection between AS 120 and MN 130, the AS 120 and the MN 130 begin exchanging keep-alive message for purposes of maintaining the always-on connection for use in supporting the improved purchasing capability.

Although depicted and described with respect to one discovery request by MN 130, discovery requests may be initiated by MN 130 periodically and/or in response to one or more trigger conditions. The use of multiple discovery requests ensures that the MN 130 establishes an always-on connection with the AS that is closest to the MN 130, which may change over time as MN 130 moves.

Although method 400 is primarily depicted and described with respect to an embodiment in which CSN 110 is application-aware, method 400 of FIG. 4 may be modified for an embodiment in which CSN 110 is not application-aware. In this embodiment, rather than initiating a data call to CSN 110, AS 120 initiates a data call to CAS 140, such that AS 120 establishes a wireless traffic channel with CSN 110 and AS 120 is registered at CAS 140. Similarly, in this embodiment, in this embodiment, rather than initiating a data call to CSN 110, MN 130 initiates a data call to CAS 140, such that MN 130 establishes a wireless traffic channel with CSN 110 and MN 130 is registered at CAS 140. In this embodiment, MN 130 sends a discovery request to CAS 140 (using the wireless traffic channel between MN 130 and CSN 110, and the core network) and, in response, CAS 140 sends a discovery response to MN 130 (using the core network, and the wireless traffic channel between CSN 110 and MN 130). In this embodiment, the discovery request from MN 130 is processed by CAS 140 instead of CSN 110, and the discovery response is generated by CAS 140 instead of CSN 110.

In this manner, using application-specific keep-alive as depicted and described with respect to FIG. 3 and FIG. 4 (or any other suitable method of providing application-specific keep-alive), AS 120 is made aware of all of the MNs within CSA 112 that are currently running the ordering application. This helps to prevent system abuses, such as where a malicious user outside the cell serving area may place a fictitious order that the user has no intention of picking up or paying for.

In this manner, using application-specific keep-alive as depicted and described with respect to FIG. 3 and FIG. 4 (or any other suitable method of providing application-specific keep-alive), an always-on connection between MN 130 and AS 120 is established prior to submission of an order from MN 130 to AS 120, thereby reducing and possibly even minimizing delay when the order is submitted from MN 130 to AS 120.

It will be appreciated that this application-specific keep-alive process, in which an application-specific paging and/or discovery process is used in order to establish an always-on connection between MN 130 and AS 120, provides other benefits for the improved purchasing process.

As described herein, submission of an order by a customer provides an implicit commitment by the customer to pay for the submitted order; however, in one embodiment of the improved purchasing capability, an explicit commitment by the customer to pay for the submitted order may be obtained using a payment commitment verification process.

Figure 5:
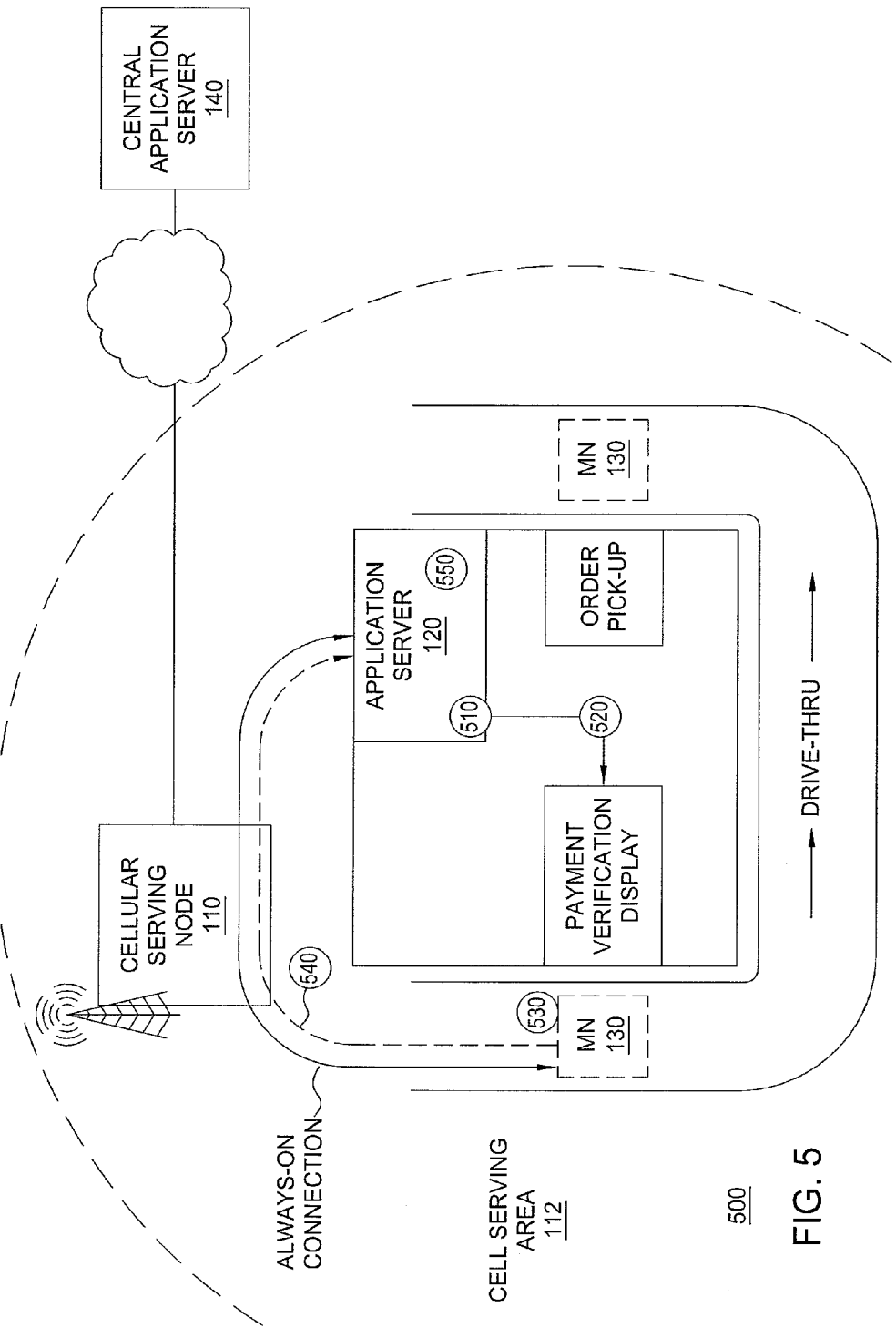
FIG. 5 depicts one embodiment of a method for providing payment commitment verification.

FIG. 5 depicts one embodiment of a method for providing payment commitment verification.

At step 510, a commitment verification code is generated for display via a commitment verification display at or near a payment verification location at the restaurant.

The commitment verification code may be generated by any suitable source. In one embodiment, the commitment verification code is generated by AS 120 and propagated from AS 120 to a payment verification location. In one embodiment, the commitment verification code is generated by CAS 140 and propagated from CAS 140 to a payment verification location (e.g., via CSN 110 and AS 120). In one embodiment, the commitment verification code is generated by a module associated with the payment verification location (for display at the payment verification location) and propagated from the module associated with the payment verification location to AS 120 and/or CAS 140 (so that AS 120 and/or CAS 140 have the generated commitment verification code for use in comparisons to entered commitment verification codes). The commitment verification code may be provided by any other suitable source of such information.

The commitment verification code may be any suitable verification code. For example, the commitment verification code may be a series of characters (e.g., a 6-digit number, a 4-character code, and the like), a word or phrase, or any other suitable verification code. The commitment verification code may be generated randomly or in any other suitable manner.

The commitment verification code may be generated periodically and/or responsively in response to one or more trigger conditions. For example, where the commitment verification code is generated periodically, the commitment verification code may be generated using in fixed intervals (e.g., once every 30 seconds, once per minute, and the like), where the interval length of the fixed intervals may depend on one or more factors such as the type of business, the average order placement time, and the like. For example, where the commitment verification code is generated responsively in response to one or more trigger conditions, the commitment verification code may be generated in response to a request by an associate of the business, in response to detection of a car in a drive-thru lane, or in response to any other suitable trigger condition(s), which may depend on one or more factors such as the type of business and the like.

At step 520, the commitment verification code is displayed via a commitment verification display at or near a payment verification location of the restaurant. The commitment verification code may be displayed such that it is visible only to the customer. The commitment verification display means, and, thus, the manner in which the commitment verification code is displayed, may depend upon the type of business for which the improved purchasing capability is provided. For example, at a drive-thru fast food restaurant, the commitment verification code may be displayed on the communication system already available via the drive-thru area at the drive-thru fast food restaurant. For example, at a movie theater, the commitment verification code may be displayed on the sign that displays the movies currently playing at the movie theater. The commitment verification code may be displayed in any other suitable manner. As described above, the commitment verification code may be generated in a number of ways and, thus, the display of the commitment verification code may be updated in a number of ways.

At step 530, MN 130 transmits an order toward AS 120 using the connection established between MN 130 and AS 120 (e.g., a connection established at the time the order is placed, or a pre-established always-on connection established and maintained using an always-on keep-alive process). The MN 130 transmits the order toward AS 120 in response to a request initiated by the user of MN 130. The order includes the item(s) to be purchased by the user and the commitment verification code currently being displayed via the commitment verification display. For example, when the user arrives at the commitment verification code display location, the user initiates the order by: (1) selecting the order item(s) (where not pre-selected by the user) or accessing a saved order (where the user has already entered and saved the order prior to arriving at the location); and (2) entering the commitment verification code currently being displayed (e.g., by entering it manually on MN 130, by speaking it into MN 130, or by any other suitable method of entering the commitment verification code); and (3) submitting the order and commitment verification code as an order for processing by AS 120.

At step 540, CSN 110 receives the order from MN 130 and transmits the order to AS 120. The order is transmitted from CSN 110 to MN 130 via CSN 110 using the connection established between MN 130 and AS 120 (e.g., a connection established at the time the order is placed, or a pre-established always-on connection).

At step 550, AS 120 processes the order received from MN 130.

At step 550, AS 120 processes the order for verification. As described herein, processing of the order for verification includes verifying that the received commitment verification code matches the generated commitment verification code. Furthermore, processing of the order for verification also may include verifying the ability of the customer to pay for the order (e.g., via some pre-established payment agreement).

At step 550, if the commitment verification code is successfully verified, the AS 120 accepts the order from MN 130 and begins processing the order for completion.

The processing of the order for completion may include any suitable steps which may be required in order to complete the order for the customer, which may depend on one or more factors such as the type of business at which the order is placed, the type of order placed, and the like.

For example, AS 120 may provide the order to one or more sales associates responsible for completing the order (e.g., in this example, by sending the order to the kitchen of the restaurant).

For example, AS 120 may propagate an order confirmation toward MN 130 for verification of the order by the customer. The order confirmation may be propagated in any suitable manner (e.g., via the connection established between AS 120 and MN 130 via CSN 110, via the commitment verification display or any other suitable display at the business, and the like, as well as combinations thereof). The order confirmation may include any suitable information, such as a list of item(s) order, an order confirmation number, a total cost of the order, and the like.

The payment may be made by the user in any suitable manner. In one embodiment, the user proceeds to a payment location (e.g. in this example, to a take-out window), remits a payment for the order, and is provided with the purchased item(s). In one embodiment, the user may be prompted with an option to initiate payment via MN 130 (e.g., as part of an order confirmation, following order confirmation, and the like), at which point the user may elect to use electronic payment or decline use of electronic payment and proceed to make a manual payment as described above. The payment may be made by the user in any other suitable manner.

At step 550, if the commitment verification code is not successfully verified, the AS 120 does not accept the order from MN 130 and, thus, does not begin processing the order for completion. In this case, AS 120 may notify the user that verification of the commitment verification code was unsuccessful. The notification may be propagated in any suitable manner (e.g., via the connection established between AS 120 and MN 130 via CSN 110, via the commitment verification display or any other suitable display at the business, and the like, as well as combinations thereof). This will enable the customer to attempt to resubmit the order, if desired.

In this manner, the user is forced to be at the location of the business before placing an order, thereby helping to prevent system abuses, such as where a malicious user outside the cell serving area may place a fictitious order that the user has no intention of picking up or paying for.

As depicted in FIG. 2-FIG. 5, the methods 200-500 of FIG. 2-FIG. 5 are primarily depicted and described within the context of exemplary system architecture 100 of FIG. 1, e.g., at least for purposes of clarity in illustrating which components of the exemplary system architecture of FIG. 1 perform which functions of respective methods 200-500 of FIG. 2-FIG. 5. Thus, it will be appreciated that, although methods 200-500 are represented in this manner, the methods 200-500 also may be represented using respective method flow diagrams indicative of respective portions of processes to be performed on components of exemplary system architecture 100 of FIG. 1.

As depicted in FIG. 1-FIG. 5, the improved purchasing capability is primarily depicted and described herein, for purposes of clarity, with respect to embodiments in which there is a single AS 120 for the ordering application within the CSA 112. It will be appreciated, however, that there may be cases in which there are multiple ASs for a given ordering application within one cell serving area. In fact, in many cases, this may be the likely scenario (e.g., for major fast food chains or other establishments for which there may be many restaurants operating within a single cell serving area). In this case, it may be necessary for each AS within the CSA to verify that a received order is in fact intended for the establishment at which the AS is located and not intended for one of the other establishments within the CSA. This type of verification can be provided in a number of ways.

In one embodiment, for example, this verification is performed by enabling the customer to manually enter establishment identification information that is indicative of the establishment for which the order is intended (e.g., the customer can select the location of the establishment from a list provided via the ordering application, the customer can enter information indicative of the establishment or the location of the establishment, and the like, as well as combinations thereof), such that the information may be submitted with the order. In one such embodiment, Geographic Positioning System (GPS) functionality built into the MN may be used to facilitate selection or entry of the establishment identification information. In one embodiment, the MN propagates the establishment identification information to each of the ASs of each of the establishments within the CSA, and the one of the ASs associated with the establishment for which the order is intended will accept the order for processing and the other establishments within the CSA will not accept the order for processing (i.e., will ignore the order).

In one embodiment, for example, this verification is performed by using the commitment verification code that is entered for purposes of verifying the commitment of the customer to pay for the order. In this embodiment, as long as each of the ASs in the CSA (or a CAS on behalf of each of the ASs in the CSA) generates unique commitment verification codes (where uniqueness is easily obtained when using a random generation process given use of enough digits or characters), each of the ASs will be able to determine whether a received order is indeed intended for the AS or is likely intended for one of the other ASs within the CSA. In some embodiments, as described hereinabove, the commitment verification code may already be included as part of the order from a customer (i.e., for purposes of payment commitment verification), such that use of the commitment verification code for the present purpose (i.e., for ensuring that orders are only accepted for processing by the correct ASs) may be provided with no additional effort. In this manner, the one of the establishments of the CSA to which the customer intends to place an order is easily verified.

In one embodiment, this verification may be performing using a combination of one or more of the above-described verification methods.

As depicted in FIG. 1-FIG. 5, the improved purchasing capability is primarily depicted and described herein within the context of purchasing food from a fast food restaurant; however, the improved purchasing capability is more generally applicable to purchasing other types of items (e.g., products, services, and the like) from other types of establishments. As indicated herein, for example, one other type of establishment that may utilize the improved purchasing capability is movie theaters. In one embodiment, at least a portion of the functions of the improved purchasing capability depicted and described herein may be modified to better suit specific purchasing of movie tickets at movie theaters, including verification of the purchases of customers such that customers may be permitted to access the theater to watch the movie. In one embodiment, for example, this purchasing verification is performed by enabling the customer to provide purchasing verification information indicative that the purchase of tickets has been completed and that the customer should thus be granted access to the movie theater. For example, the customer may manually enter a confirmation code via the MN which may then be transmitted to the AS or the CAS for verification. For example, the customer may use a scan feature of the MN to scan the bar code of tickets (e.g., tickets purchased and printed at home, tickets purchased at the movie theater, and the like) for transmission to the AS or CAS for verification. The AS or CAS, based on evaluation of the purchasing verification information, then initiates signaling of entrance verification information adapted for use in allowing the customer to enter the theater or preventing the customer from entering the theater. In one embodiment, in which a human ticket collector is present at the ticket entrance at the movie theater to collect tickets from the customer before the customer enters the theater), the entrance verification information may be displayed on a display device located at or near the ticket entrance, such that the ticket collector may review the entrance verification information and either allow the customer to enter the theater or prevent the customer from entering the theater. In one embodiment, in which an automated door-keeper is present at the ticket entrance at the movie theater, the entrance verification information may be adapted for controlling the automated door-keeper to either allow the customer to enter the theater or prevent the customer from entering the theater.

In one embodiment, for example, this purchasing verification is performed using the commitment verification code that is entered for purposes of verifying the commitment of the customer to pay for the order.

In one such embodiment, for example, in which a human ticket collector is present at the ticket entrance at the movie theater to collect tickets from the customer before the customer enters the theater), the commitment verification code may be displayed on a display device located at or near the ticket entrance. In this case, the customer could enter the displayed commitment verification code and submit the commitment verification code for processing by the AS or CAS. The result of the commitment verification processing may then be displayed to the ticket collector (e.g., on the display device on which the commitment verification code is displayed, or even on a different display device that may be visible only to the ticket collector) so that the ticket collector can verify completion of the purchase before the customer is allowed to enter the theater.

In one such embodiment, for example, in which an automated door-keeper is present at the ticket entrance at the movie theater, the commitment verification code may be displayed on a display device located at or near the ticket entrance. In this case, the customer could enter the displayed commitment verification code and submit the commitment verification code for processing by the AS or CAS. The result of the commitment verification processing may then be sent to the automated door-keeper for providing an indication to the automated door-keeper as to whether or not the customer should be allowed to enter the theater.

In the above-described embodiments, the automated door-keeper may be any suitable door-keeper and, thus, may include any suitable means for denying/allowing customers entrance to the movie theater based on whether or not the purchase by the customer is verified (e.g., such as using a rotating bar, sliding doors, and other similar means as used in subways systems, amusement parks, and the like). The communication from the AS or CAS to the automated door-keeper may be implemented in any suitable manner (e.g., using at least a portion of the communications capabilities described herein or using any other suitable means of indicating to the automated door-keeper as to whether the customer should be denied or allowed access to the theater).

Although primarily depicted and described with respect to use of cellular wireless access to support the improved purchasing capability, in other embodiments the improved purchasing capability may be provided using other types of wireless access capabilities, such as using Wireless Fidelity (WiFi) wireless access, Radio-Frequency Identification (RFID) wireless access techniques, Bluetooth, and the like, or any other suitable wireless access technologies.

Although primarily depicted and described with respect to use of the improved purchasing capability for improving purchasing of items from businesses, it will be appreciated that the improved purchasing capability may be applied to improve any service queuing situation.

Figure 6:
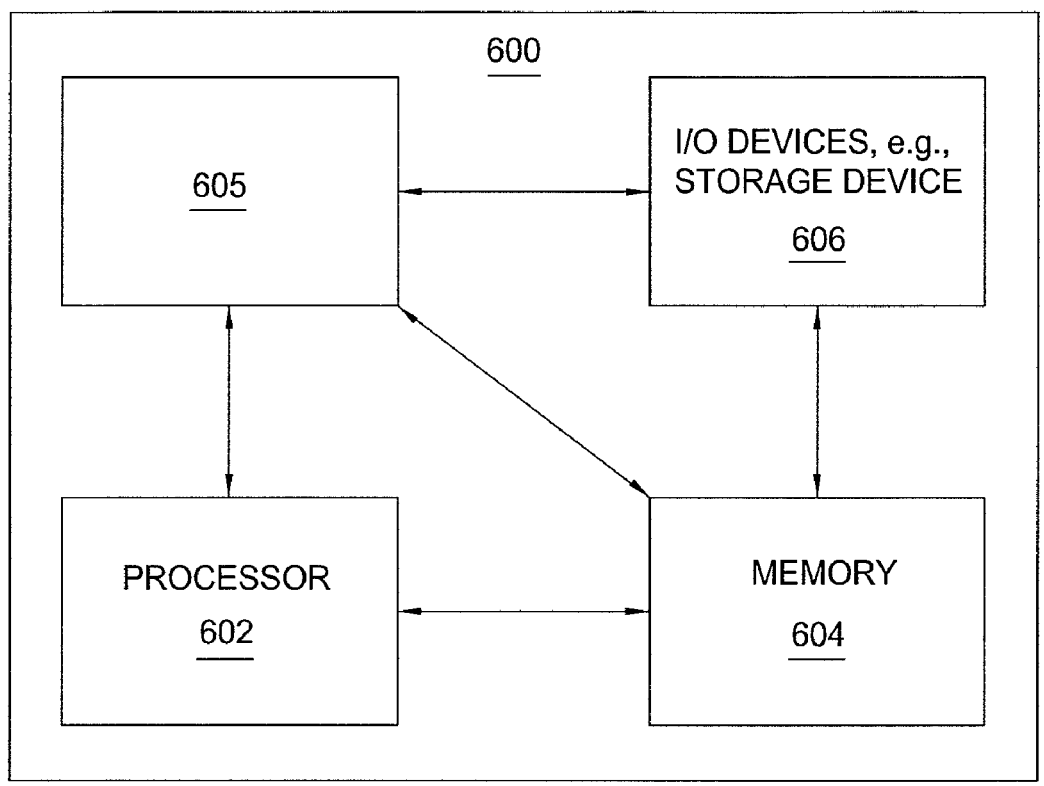
FIG. 6 depicts a high-level block diagram of a computer suitable for use in performing the functions described herein.

FIG. 6 depicts a high-level block diagram of a computer suitable for use in performing the functions described herein. As depicted in FIG. 6, computer 600 includes a processor element 602 (e.g., a central processing unit (CPU) and/or other suitable processor(s)), a memory 604 (e.g., random access memory (RAM), read only memory (ROM), and the like), an ordering/purchasing module/process 605, and various input/output devices 606 (e.g., a user input device (such as a keyboard, a keypad, a mouse, and the like), a user output device (such as a display, a speaker, and the like), an input port, an output port, a receiver/transmitter (e.g., an air card or other suitable type of receiver/transmitter), and storage devices (e.g., a hard disk drive, a compact disk drive, an optical disk drive, and the like)).

It should be noted that functions depicted and described herein may be implemented in software and/or in a combination of software and hardware, e.g., using a general purpose computer, one or more application specific integrated circuits (ASIC), and/or any other hardware equivalents. In one embodiment, the ordering/purchasing process 605 can be loaded into memory 604 and executed by processor 602 to implement the functions as discussed herein above. Thus, ordering/purchasing process 605 (including associated data structures) can be stored on a computer readable storage medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for using a cellular serving node to facilitate placement of an order of a customer using an ordering application, the method comprising:

receiving, at the cellular serving node from a mobile node supporting the ordering application, an order comprising an indication of at least one item being ordered by the customer; and propagating, from the cellular serving node toward an application server supporting the ordering application, the order of the customer for processing of the order by the application server;

wherein the cellular serving node is application-aware and is configured to recognize the order as being associated with the ordering application supported by the mobile node and the application server.

2. The method of claim 1, wherein the cellular serving node receives the order from the mobile node and propagates the order toward the application server without forwarding the order toward a core network supporting the cellular serving node.

3. A method for using a cellular serving node to facilitate placement of an order of a customer using an ordering application, the method comprising:
- receiving, at the cellular serving node from a mobile node supporting the ordering application, an order comprising an indication of at least one item being ordered by the customer; and
- propagating, from the cellular serving node toward an application server supporting the ordering application, the order of the customer for processing of the order by the application server;
- wherein the order is received and propagated via an application-layer connection established between the mobile node and the application server, wherein the application-layer connection is pre-established by a method comprising:
  - receiving, at the cellular serving node, a request of the application server for a list of mobile nodes that are both within the cell serving area of the cellular serving node and running the ordering application supported by the application server; and
  - initiating, from the cellular serving node, an application-specific paging process by which mobile nodes within the cell serving area of the cellular serving node are paged with a request to respond to the cellular serving node responsive to a determination that the mobile nodes are currently running the ordering application supported by the application server.

4. A method for using a cellular serving node to facilitate placement of an order of a customer using an ordering application, the method comprising:
- receiving, at the cellular serving node from a mobile node supporting the ordering application, an order comprising an indication of at least one item being ordered by the customer; and
- propagating, from the cellular serving node toward an application server supporting the ordering application, the order of the customer for processing of the order by the application server;
- wherein the order is received and propagated via an application-layer connection established between the mobile node and the application server, wherein the application-layer connection is pre-established by a method comprising:
  - receiving, at the cellular serving node, a request of the application server to establish a first wireless traffic channel with the cellular serving node;
    - receiving, at the cellular serving node, a request of the mobile node to establish a second wireless traffic channel with the cellular serving node;
    - receiving, at the cellular serving node, an application-level request by the mobile node to identify at least one application server located within the cellular serving area that is running the ordering application; and
    - propagating, toward the mobile node using the second wireless traffic channel, information identifying the application server running the ordering application.

5. A method for processing an order of a customer at an application server supporting an ordering application, wherein the ordering application is available on a mobile node of the customer, the method comprising:
- receiving the order at the application server, wherein the order is received via an application-layer connection between the mobile node and the application server via a cellular serving node serving a location at which the application server is deployed, wherein the order comprises an indication of at least one item being ordered; and
- processing the order at the application server, wherein processing the order at the application server comprises determining whether the order is accepted by the application server, wherein determining whether the order is accepted comprises:
  - receiving an entered commitment verification code associated with the order; and
  - comparing the entered commitment verification code to a generated commitment verification code;
  - wherein the generated commitment verification code is generated by the application server and displayed via a display that is proximate the location of the application server.

6. The method of claim 5, wherein the application-layer connection is an always-on connection maintained using an application-specific keep-alive process.

7. The method of claim 5, wherein the application-layer connection is pre-established by a method comprising:
- initiating, from the application server toward the cellular serving node, a request of the application server for a list of mobile nodes that are both within the cell serving area of the cellular serving node and running the ordering application supported by the application server;
- wherein the request of the application server is adapted for causing the cellular serving node to initiate an application-specific paging process by which mobile nodes within the cell serving area of the cellular serving node are paged with a request to respond to the cellular serving node if the mobile node are currently running the ordering application supported by the application server.

8. The method of claim 5, wherein the application-layer connection is pre-established by a method comprising:
- propagating, from the application server toward the cellular serving node, a request of the application server to establish a first wireless traffic channel with the cellular serving node; and
- receiving, at the application server via the cellular serving node, a request of the mobile node to establish the application-layer connection with the application server.

9. The method of claim 5, wherein the entered verification code is received as part of the order.

10. The method of claim 5, wherein, when the order is accepted, the method further comprises:
- initiating at least one action for completing the order, wherein the at least one action for completing the order comprises at least one of:
  - forwarding the order toward at least one order processing system;
  - propagating an order successful message from the application server toward the mobile node via the application-layer connection; and
  - initiating an electronic payment transaction.

11. The method of claim 5, wherein, when the order is not accepted, the method further comprises propagating an order unsuccessful message toward the mobile node via the application-layer connection.

12. A cellular serving node configured to facilitate placement of an order of a customer using an ordering application, comprising:
- a processor and a memory communicatively connected to the processor, the processor configured to:

receive, at the cellular serving node from a mobile node supporting the ordering application, an order comprising an indication of at least one item being ordered by the customer; and propagate, from the cellular serving node toward an application server supporting the ordering application, the order of the customer for processing of the order by the application server;

wherein the cellular serving node is configured to be application-aware and to recognize the order as being associated with the ordering application supported by the mobile node and the application server.

13. An application server configured to process an order of a customer, the application server configured to support an ordering application, wherein the ordering application is available on a mobile node of the customer, the application server comprising:

a processor and a memory communicatively connected to the processor, the processor configured to:

receive the order at the application server, wherein the order is received via an application-layer connection between the mobile node and the application server via a cellular serving node serving a location at which the application server is deployed, wherein the order comprises an indication of at least one item being ordered; and process the order at the application server, wherein to process the order at the application server the processor is configured to determine whether the order is accepted by the application server, wherein to determine whether the order is accepted the processor is configured to:

receive an entered commitment verification code associated with the order; and compare the entered commitment verification code to a generated commitment verification code;

wherein the application server is configured to generate the commitment verification code and initiate display of the generated commitment verification code via a display that is proximate the location of the application server.

* * * * *